Patented Mar. 7, 1933

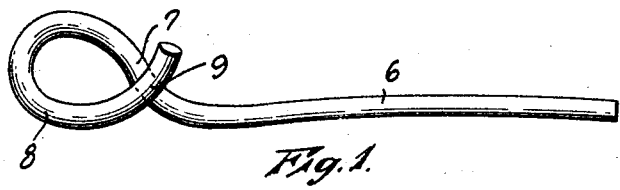
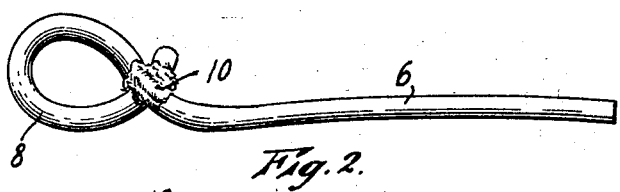
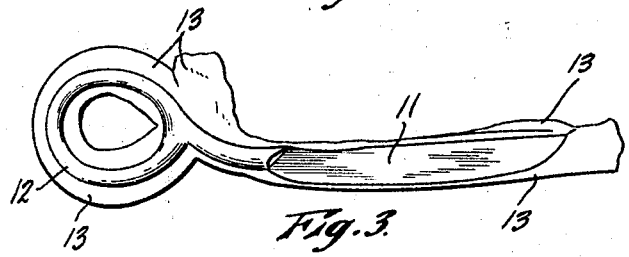
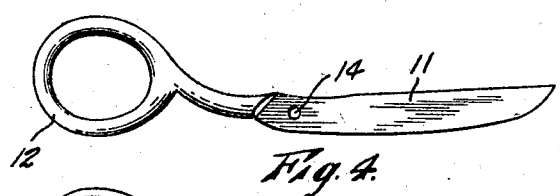
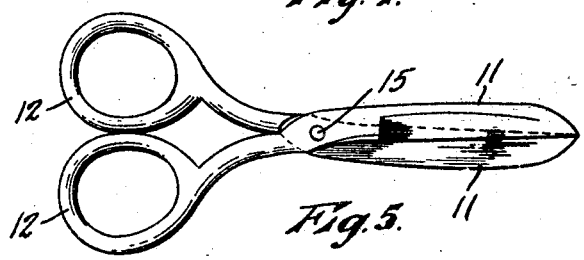

1,900,413

UNITED STATES PATENT OFFICE

EDWARD W. CARPENTER, OF FAIRFIELD, CONNECTICUT, ASSIGNOR TO THE E. W. CARPENTER MANUFACTURING COMPANY, OF BRIDGEPORT, CONNECTICUT, A CORPORATION OF CONNECTICUT

METHOD OF MAKING SHEARS

Application filed July 6, 1931. Serial No. 548,740.

This invention relates to new and useful improvements in method of making shears including scissors.

An object of the invention is to provide an improved method of making shears whereby there is a great savings in materials used in the making of shears and whereby shears may be more cheaply manufactured.

Another object is to provide a method of making shears whereby each shear blade and loop, or half or element of a pair of shears is made from a length of wire one end portion of which is bent or doubled upon itself and cross and then welded where it crosses whereby to form a solid structure after which the wire is formed in a forming die and the flashing cut off and the part finished.

Other objects and advantages will appear as the description proceeds. However, it is to be understood that the invention is not limited to the precise details herein disclosed and that the invention comprehends all such variations or modifications of the method as fall within the spirit of the invention or the scope of the appended claims to which claims reference may be had for a definition of the invention.

In the accompanying drawing:

Fig. 1 is a view showing a length of wire one end of which is bent upon and across itself, this representing the first step in the improved method;

Fig. 2 is a view showing the wire of Fig. 1 after it has been welded at its point of cross, this representing the second step of the improved method;

Fig. 3 shows the wire after it has been swaged or formed in the forming dies;

Fig. 4 is a view showing the formed part of Fig. 3 after the flashing has been trimmed therefrom and the part finished; and Fig. 5 is a plan view of a pair of scissors or shears representing two of the parts shown in Fig. 4 and riveted together.

According to the present invention, shears or scissors are formed of wire of a suitable gauge and by following the method of the present invention a considerable savings in material and tool cost is effected. The first step in the method consists in cutting a wire into suitable lengths and then treating the lengths, as for example, in a slide machine whereby to bend or double an end portion of the length of wire upon itself to form a closed loop.

In Fig. 1 of the accompanying drawing is shown a length of wire 6 one end portion of which is laterally off-set as at 7 and doubled upon itself to form a loop 8. The end of the wire is carried across the off-set 7 as at 9. Next, the wire is spot welded at the point 9 where portions of the wire cross whereby to provide a solid structure at this point. The wire 6 after the spot welding operation is shown in Fig. 2 and the weld is indicated at 10. Since the metal is melted together at this point 10 it will be obvious that a solid or integral structure is provided including a shank or wire having a closed loop at one end.

After the spot weld 10 is made the part being processed is passed to a forming or swaging die from which it emerges substantially as shown in Fig. 3 of the accompanying drawing. Here it will be seen that the part now includes a blade 11 and a solid or continuous shaped loop 12 integral with the blade. The wire being used should be of such diameter as to provide a slight surplus of material in order to insure the formation of a complete blade and loop, and when the part is taken from the forming dies this surplus material is in the form of a flashing 13.

After the flashing 13 is trimmed off the part or shear element may be finished and polished and provided with the pivot opening 14. The completed part is shown in Fig. 4 and in Fig. 5 two similar parts are shown pivotally connected as by a rivet or bolt 15. It will, of course, be understood that the two elements forming the scissors shown in Fig. 5 need not be exactly alike and that if desired the loop 12 of one may be elongated as to receive several fingers of a hand while the loop 12 of the other element is adapted to receive a thumb. Further, the blades themselves may be of slightly different shape as for example one blade may be more tapered than the other and have a sharper point.

Having thus set forth the nature of my invention, what I claim is:

1. The method of making a shear blade and loop consisting in doubling an end portion of a wire upon and across itself to form a loop, welding the portions of the wire together where said portions cross, swaging the wire in forming dies to form a solid blade and loop, and finishing the formed blade and loop.

2. The method of making a shear blade and loop consisting in doubling an end portion of a wire upon and across itself to form a loop, welding the portions of the wire together where said portions cross, swaging the same in forming dies to form a solid blade and loop, trimming the flashing from the formed blade and loop, and finishing the same.

3. The method of making a shear blade and loop consisting in doubling an end portion of a wire upon and across itself to form a wire having a loop at one end, spot welding the portions of the wire together where said portions cross, swaging the same in forming dies to form a solid blade and loop, and finishing the same.

4. The method of making a shear blade and loop consisting in doubling an end portion of a wire upon and across itself to form a loop off-set to one side of the longitudinal center line of the wire, welding the portions of the wire together where said portions cross, swaging the same in forming dies to form a solid blade and loop, and finishing the blade and loop thus formed.

5. The method of making a one piece blade and loop consisting in doubling an end portion of a wire upon and across itself to form a wire having a loop at one end, welding the portions of the wire together where said portions cross, swaging the same in forming dies to form a solid blade and loop, trimming the flashing from the formed blade and loop, and finishing the same.

6. The method of making a shear blade and loop consisting in doubling an end portion of a wire upon itself to form a loop, welding the portions of the wire together where they meet to form the loop, swaging the wire in forming dies to form a solid blade and loop, and finishing the formed blade and loop.

In testimony whereof I affix my signature.

EDWARD W. CARPENTER.